(12) United States Patent
Kirkpatrick

(10) Patent No.: US 8,588,863 B2
(45) Date of Patent: *Nov. 19, 2013

(54) DEVICE, SYSTEM, AND METHOD OF AUGMENTING CELLULAR TELEPHONE AUDIO SIGNALS

(75) Inventor: Mark Kirkpatrick, Conyers, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1218 days.

This patent is subject to a terminal disclaimer.

(21) Appl. No.: 11/866,361

(22) Filed: Oct. 2, 2007

(65) Prior Publication Data

US 2008/0020805 A1 Jan. 24, 2008

Related U.S. Application Data

(63) Continuation of application No. 09/964,389, filed on Sep. 28, 2001, now Pat. No. 7,277,734.

(51) Int. Cl.
*H04M 19/04* (2006.01)
(52) U.S. Cl.
CPC .................................. *H04M 19/04* (2013.01)
USPC ..... 455/567; 455/401; 455/412.1; 455/575.1; 455/90.03
(58) Field of Classification Search
CPC ............ H04M 1/72575; H04M 19/04; H04M 1/72558
USPC .......... 455/90.01, 90.03, 401, 567, 572, 573, 455/575.1; 379/373.01–373.04, 379/374.01–374.02; 340/636.1, 636.16, 340/7.2, 7.32
See application file for complete search history.

(56) References Cited

U.S. PATENT DOCUMENTS

| | | | | |
|---|---|---|---|---|
| 5,767,778 | A * | 6/1998 | Stone et al. | 340/636.1 |
| 6,496,692 | B1 * | 12/2002 | Shanahan | 455/418 |
| 6,707,908 | B1 * | 3/2004 | Nagasawa | 379/374.01 |
| 2001/0044331 | A1 * | 11/2001 | Miyoshi et al. | 455/572 |
| 2002/0018556 | A1 * | 2/2002 | Okazaki et al. | 379/373.02 |
| 2002/0052224 | A1 * | 5/2002 | Yoon | 455/567 |

FOREIGN PATENT DOCUMENTS

JP 2000316038 A * 11/2000

* cited by examiner

*Primary Examiner* — Melur Ramakrishnaiah
(74) *Attorney, Agent, or Firm* — Hartman & Citrin LLC

(57) ABSTRACT

A device, system and method is described for augmenting cellular telephone signals for a cellular telephone. In an exemplary embodiment, an audio signal device cellular is provided with a sound generating device that stores one or more audio signals that are activated upon receipt of a telephone call. Optionally, the audio signal device may store a library of audio signals that may be programmable and edited. The device, system and method of the present invention enables a user to choose audio alert sounds beyond the scope of those provided by the manufacturer of a cellular telephone.

20 Claims, 4 Drawing Sheets

DEVICE, SYSTEM, AND METHOD OF AUGMENTING CELLULAR TELEPHONE AUDIO SIGNALS

RELATED CASES

The present application is a continuation of U.S. patent application Ser. No. 09/964,389, entitled DEVICE, SYSTEM, AND METHOD OF AUGMENTING CELLULAR TELEPHONE AUDIO SIGNALS, filed on Sep. 28, 2001 now U.S. Pat. No. 7,277,734 and is hereby incorporated by reference.

BACKGROUND

1. Field of the Invention

The present invention relates generally to accessory technology used with cellular telephones. More specifically, the present invention is directed to a device, system and method for augmenting cellular telephone audio signals through a programmable accessory device.

2. Background of the Invention

Cellular telephones, also commonly known as mobile telephones, have become increasingly utilized throughout the world. Typical signals used to alert a user of a cellular telephone of an incoming telephone call include audio signals such as ringing, visual signals such as flashes or written messages, or touch signals such as vibration of the telephone. A combination of signals also is possible, such as, for example, a combination of audio and visual signals.

When a cellular telephone provides audio signals, the user typically has a limited number of pre-selected audio signal selections (which may include standard rings, musical tones, or melodies) already programmed into the telephone. Many conventional telephones do not have the ability to introduce additional audio alert signals. Thus, the user is confined to a limited group of audio alert signals that a manufacturer has pre-programmed into the telephone. Although some telephone systems allow a user to download additional audio alert signals into the telephone, such additional signals typically are provided only by the manufacturer, and are merely an expansion of the original limited inventory of audio signals available to a user. Thus, the user is still confined to a set of audio signals that a manufacturer provides to its users. The user does not have the ability to use audio signals of her own choice, such as, for example, a favorite song or melody, sounds of nature, or voice sounds of a child or a pet or the user herself.

Thus, there is a need for an economical but flexible accessory device, system, and method that enables a user to easily choose any type of audio sounds to be used by a cellular telephone and allow such audio sounds to be designated as the incoming telephone call audio alert signal.

SUMMARY OF THE INVENTION

The present invention overcomes the drawbacks of conventional cellular telephone audio alert signals by providing a device, system and method that enables the user to enter audio signals of his or her own choice to use as audio alert signals for the telephone.

As used throughout this disclosure, the term "augmenting", when used in reference with cellular telephone audio signals, refers to an increase in choices that a user has for audio alert signals. Thus, an increase in choices of alert signals beyond that provided by a manufacturer is an augmenting of cellular telephone audio signals.

As used throughout this disclosure, the term "sound generating device" is any assembly that is capable of storing sound files, retrieving sound files, and playing sound files. Thus, such a device typically is piezoelectric and contains software to enable a stored sound file to be played, necessary EPROM, ROM and/or RAM memories, and a small speaker. Such sound generating devices typically are used in toys and musical cards. This sound generating device 110 will be explained in use below.

In accordance with an exemplary embodiment, the present invention provides an audio signal device that plays sounds and is used with a cellular telephone. The audio signal device has electrical terminals, located on a shell, that are connectable with electric terminals on a cellular telephone. The audio signal device optionally also has electric terminals that are connectable with electric terminals on a cellular telephone battery. The audio signal device also has a sound generating device capable of storing a sound file. The sound generating device is triggered to play sound when an incoming telephone call is received. Thus, the audio signal device is attachable to an existing cellular telephone body without need for modification to the telephone body or the cellular telephone battery. Optionally, the sound generating device can store multiple sound files, and a selector switch on the shell that allows a user to select a designated sound file from the multiple sound files. Furthermore, an optional external connector socket allows a user to edit, add or delete sound files stored in the sound generating device.

In accordance with another exemplary embodiment, the present invention provides a cellular telephone system that includes a cellular telephone body, a cellular telephone battery, and an audio signal device as described above.

In accordance with yet another exemplary embodiment, the present invention provides a method of programming designated audio alert signals on a cellular telephone by adding or deleting sound files to the audio signal device as described above.

In accordance with another exemplary embodiment, the present invention provides a method of selecting a designated audio alert signal on a cellular telephone using the selector switch as described above to scroll through a selection of audio files on the audio signal device, hearing the selections, and choosing one to be the designated alert signal for incoming telephone calls.

In accordance with an exemplary embodiment, the present invention includes a device, system and method for selectively programming a telephone with any type of sound signal to be used as an audio alert signal for incoming calls.

In another exemplary embodiment of the present invention, the present invention includes a device, system and method that is compatible with different types of cellular telephone systems.

It is therefore an object of the present invention to provide a device, system, and method of augmenting cellular telephone audio alert signals that do not require changing the design of the telephone body itself.

It is yet another object of the present invention to provide a device for augmenting cellular telephone audio alert signals that is designed to fit between the telephone body and the battery.

These and other objects of the present invention will become apparent upon a reading of the following detailed description in conjunction with the associated drawings.

It is to be understood that both the foregoing general description and the following detailed description are exemplary and explanatory only and are not restrictive of the invention, as claimed.

The advantages and purpose of the invention will be set forth in part in the description that follows, and in part will be obvious from the description, or may be learned by practice of the invention. The advantages and purpose of the invention will be realized and attained by means of the elements and combinations particularly pointed out in the appended claims.

DETAILED DESCRIPTION OF THE INVENTION

Figure 1:
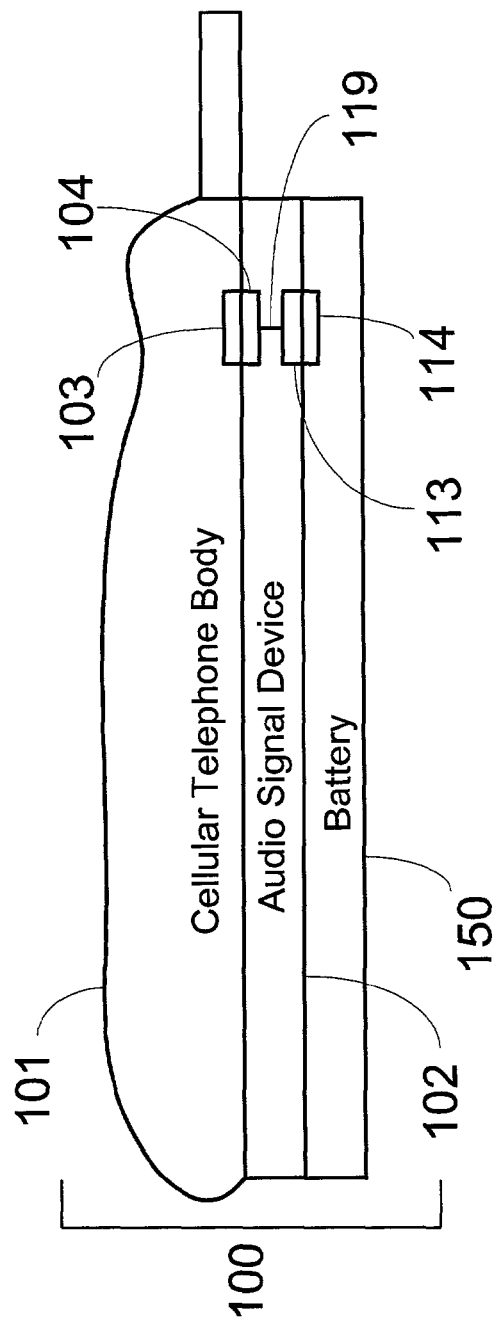
FIG. 1 illustrated an exemplary embodiment of the present invention in position between a cellular telephone body and a cellular telephone battery.

An exemplary embodiment of a device according to the present invention is shown in FIG. 1. A cellular telephone system 100 using the exemplary embodiment of the audio signal device 102 is shown. A cellular telephone 101 is positioned to one side of the audio signal device 102 and a conventional cellular telephone battery 150 is positioned on the opposite side of audio signal device 102. Electrical connectors 103, 104, 113, and 114 connect the three components of the system 100 together. Electrical connectors 103 on the cellular telephone body 101 electrically communicate with electrical connectors 104 on the audio signal device 102. Electrical connectors 114 on the audio signal device electrically communicate with electrical connectors 114 on the battery 150.

Suitable physical connection means (not shown) are used to reversibly lock the cellular telephone body 101 to the audio signal device 102, and the audio signal device 102 to the battery 150. Such connection means include those that are commonly used to reversibly lock a cellular telephone body 101 to a standard cellular battery 150.

Furthermore, in the embodiment shown in this FIG. 1, device 102 is sandwiched between the cellular telephone body 101 and the battery 150. However, the audio signal device 102 also may be positioned elsewhere, such as, for example, on the outside end of a battery 150 such that the battery is sandwiched between the cellular telephone body 101 and the audio signal device 102. In such an embodiment, the battery 102 must be designed to be electrically and physically connectable to both the cellular telephone body 101 and the audio signal device 102.

Figure 2:
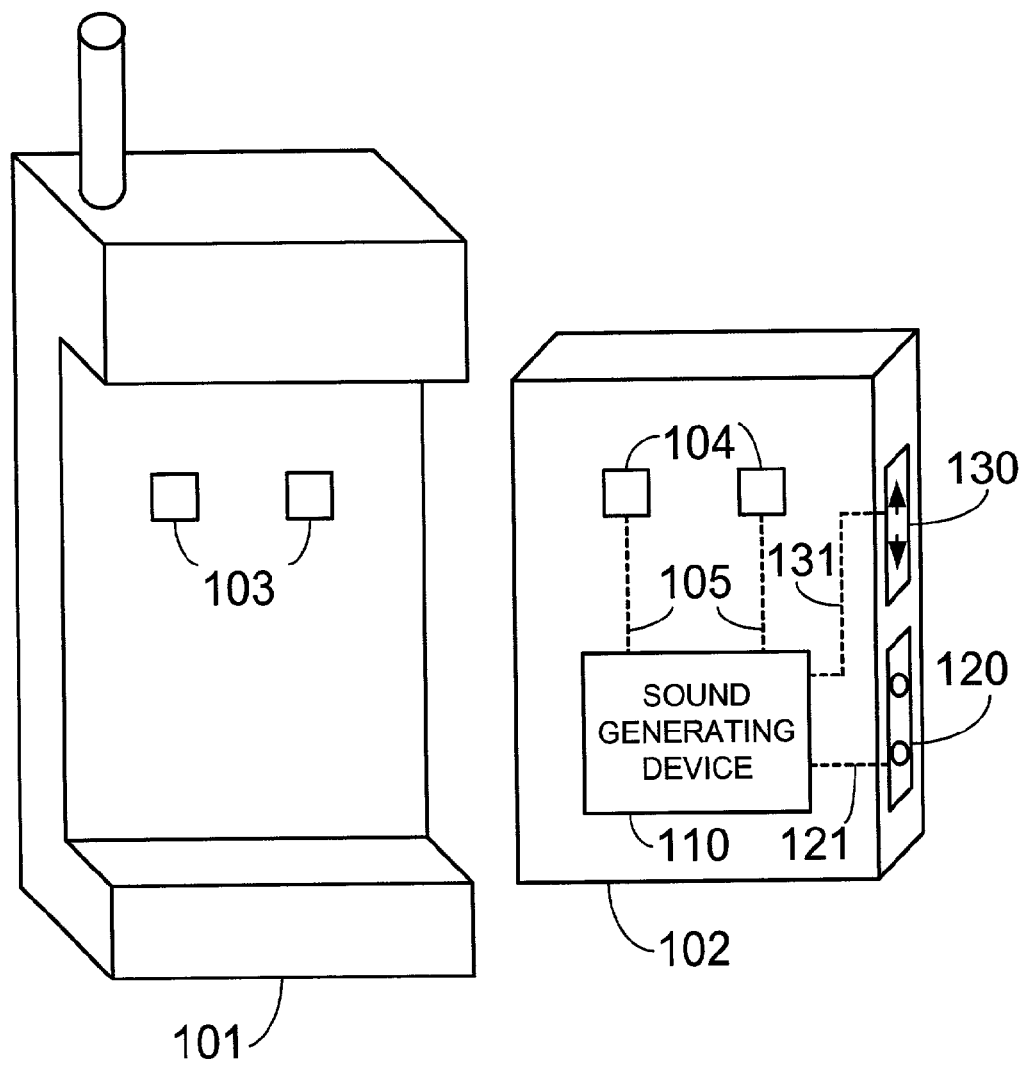
FIG. 2 illustrates a conventional cellular telephone body with a device, according to an exemplary embodiment of the present invention, that allows for a variety of audio alert signals to be used.

FIG. 2 illustrates a standard telephone body 101 in relation to a device 102 according to an exemplary embodiment of the present invention. The device 102 is in the form of a substantially rectangular planar shell that produces sound, thereby making such a device, system and method of augmenting telephone audio signals both economical and flexible.

Figure 3:
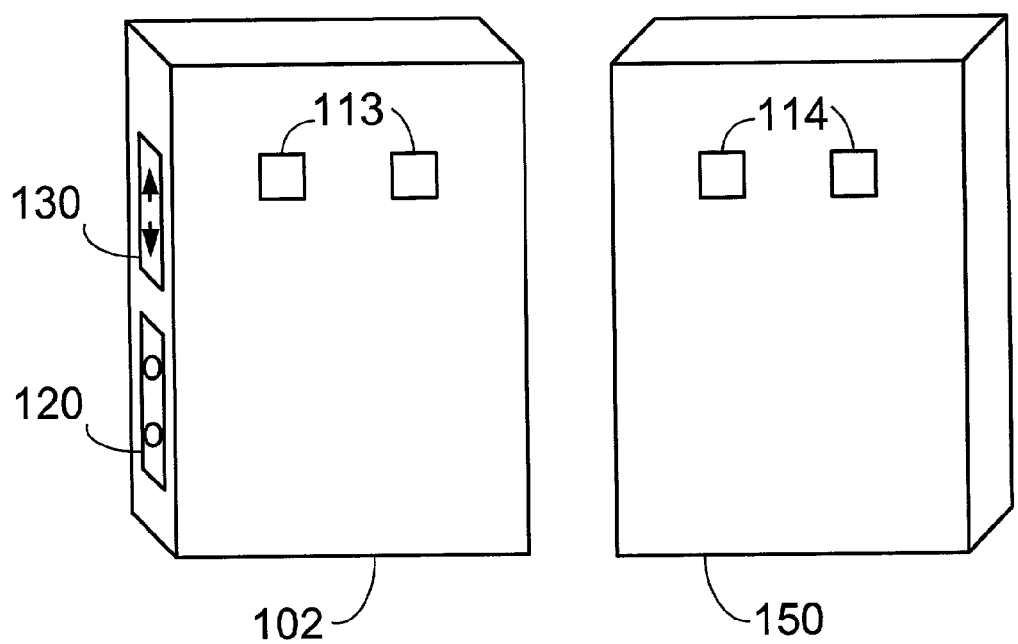
FIG. 3 illustrates an exemplary embodiment of the invention in conjunction with a cellular telephone battery.

The exemplary embodiment of the present invention shown in FIGS. 2-3 presents an improvement based on the technology of vibrating batteries, wherein an activation signal is directed to the vibrating battery to vibrate the telephone when an incoming call is received. Thus, the audio signal device 102 according to the embodiment shown in FIGS. 2-3 also depends upon an incoming signal from the body of the telephone 101 to alert the battery 150 of an incoming call. The telephone body 101 does not have to be modified to accommodate the new audio signal device 102. Furthermore, the battery 150 does not need to be modified to attach to the audio signal device 102.

Thus, the telephone body 101 is merely set up as if the battery 150 is a vibrating battery, thereby enabling the telephone body 101 to send a signal to the battery 150 through the audio signal device 102 when an incoming telephone call is received. Such a signal is needed by the battery 150 in order to activate a recorded sound signal in the audio signal device 102.

The telephone body 101 is in electrical communication with the audio signal device 102 through suitable terminal connectors 103 and 104, respectively. Thus, when an incoming telephone call signal is detected by the cellular telephone system 100, the telephone body 101 sends a signal to the battery 150 through the audio signal device 102. When the audio signal device 102 is connected to a conventional vibration battery 150, the audio sound generating device 110 in the audio signal device 102 is signaled to activate, producing a given audio alert signal. In all aspects, the telephone body 101 is conventional and only needs to be able to notify the audio signal device 102 that an incoming telephone signal has been received. Furthermore, the designated audio alert signal also may be used for other notification alarms that are available on the cellular telephone, such as appointment alarms and the like.

Sound generating device 110 may comprise, for example, a piezoelectric device for converting electronic signals to sound waves. Alternatively, it may also comprise a miniature speaker or other transducer for converting electronic signals to sound waves. The sound generating device also has a memory in which the sound files can be stored. A sound chip that has all the components necessary to store, access, play, and generate sound from sound files may be used.

The audio signal device 102 has terminal connectors 104 that communicate with a sound generating device 110 through suitable electrical connectors 105. Furthermore, battery 150 provides power via terminal connectors 114 on battery 150 to terminal connectors 113 on audio signal device 102, to terminal connectors 104 via connector 119, and to terminal connectors 103 on the telephone body 101. The power storage area of the battery 150 is not shown in the Figures for sake of clarity. However, the power storage area of the battery 150 also is in communication with the terminal connectors 114 through suitable electrical connectors.

Sound generating device 110 may be pre-programmed with a set of audio signals that a user may use as the audio alert signal when an incoming telephone call is received. Thus, a user may purchase an audio signal device 102 that has a list of audio alert signals pre-programmed into it. As a non-limiting example, different audio signal devices 102 may have different themes, such as "sounds of nature", "popular songs", and "different automobile honks". When a user prefers another set of audio alert signals, she merely has to purchase another battery that provides such signals.

Optionally, an audio signal device 102 provides a user with a list of accessible audio alert signals. In that case, the user needs a means to select a particular desired audio signal. Such a selector means to select a desired audio alert signal may be, for example, a selector switch, button, mechanical selector, touch pad, or the like. In the embodiment shown in FIGS. 2-3, a selector switch 130 is shown that enables a user to select a desired audio alert signal by pressing up or down selector arrows that allow the user to scroll through an internal library of signals stored in audio signal device 102. Switch 130 shown in the exemplary embodiment functions by applying a gentle pressure on the up or down arrow to scroll the selection of internal audio signals in one direction or the other. Preferably, the user can hear the selections as the selections are being scrolled so as to have an indication of which signal the audio signal device 102 is being locked into using as the pre-selected audio alert signal.

Alternatively, to expand the selections of audio alert signals even beyond that provided by pre-packaged audio signal devices 102 having specific themes, an accessing means would be beneficial to provide a user with ability to access and edit the audio signal library of the audio signal device 102. Thus, such a means for accessing the signal library of the audio signal device 102 may be, for example, an electrical connector socket, plug, adapter, or the like. In the exemplary embodiment shown in FIG. 1, an electrical connector socket 120, which is electrically connected to the sound generating device 110 through suitable electrical connectors 121, is designed to receive a conventional two prong plug 220, such as the one shown in FIG. 4.

Although the switch 130 and the connector socket 120 are shown on a side of the audio signal device 102 for sake of accessibility and ease of operation for a user, such placement is merely exemplary. The switch 130 and socket 120 may be placed anywhere on the audio signal device 102 as long as they may be accessed by a user and are usable for their intended purposes.

Figure 4:
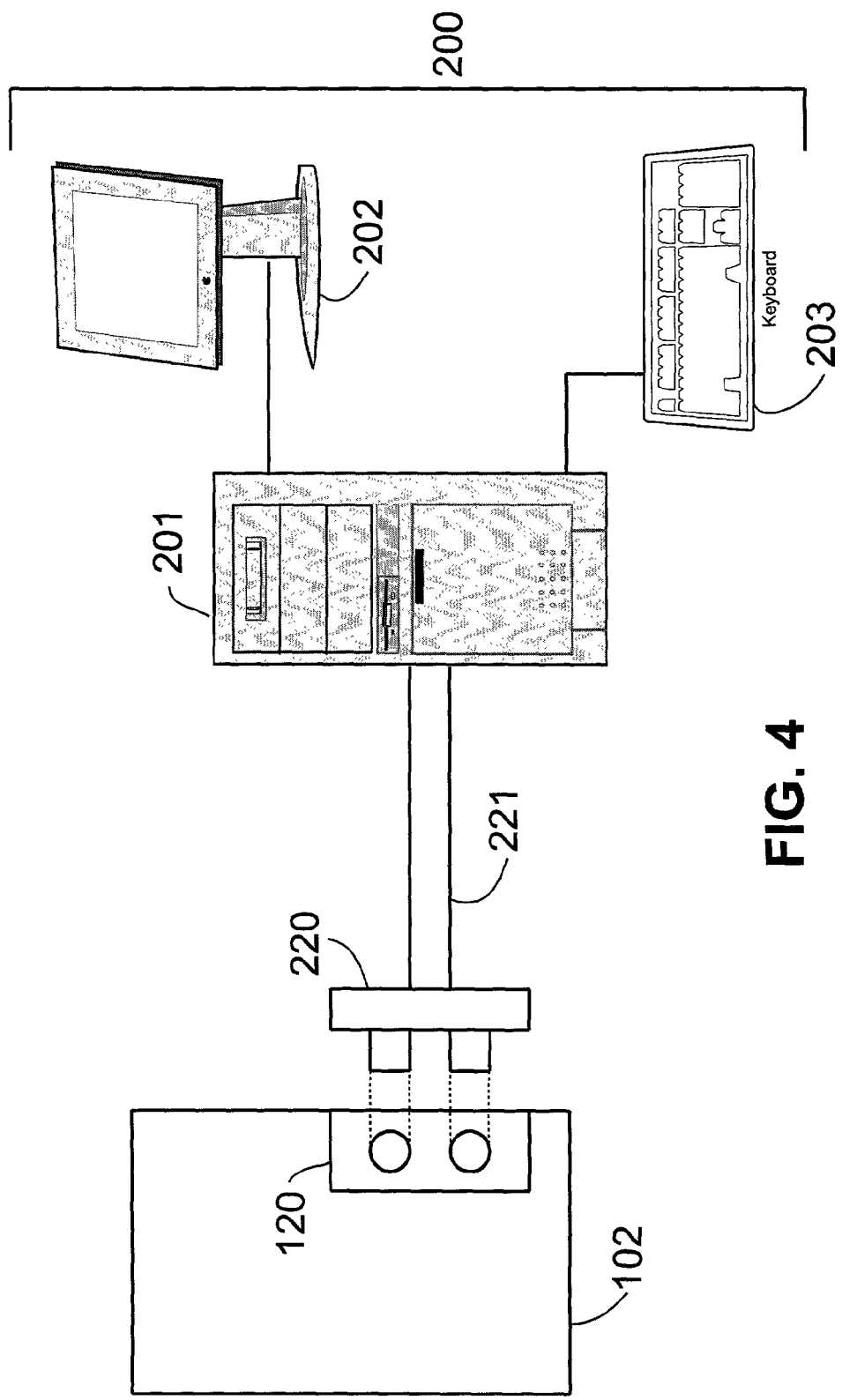
FIG. 4 illustrates an exemplary embodiment of a device, system, and method of programming audio alert signals into a device according to the exemplary embodiments shown in FIGS. 1-3.

A means for programming the audio signal selection of an audio signal device 102 is shown in the exemplary embodiment in FIG. 4 as system 200. System 200 includes a plug 220 that electrically communicates with socket 120, and allows a computer 201 to program the sound generating device 110 (not shown in FIG. 4). In this embodiment, computer 201 is provided with software that allows a user access and edit the audio alert signal library in the sound generating device 110. The computer 201 may be a desktop model with a monitor 202 and a keyboard 203, a laptop, a personal data assistant, or any other device that has the ability to electronically access a library or stored audio files in a sound generating device 110.

Through programming system 200, the user may add or delete sound files from the sound generating device 110. The sound files may be in any suitable format, such as, for example, MP3. Preferably, the user may arrange the order of sound signals in an audio signal device 102, delete any sounds signals that are no longer desired, and/or add new sound signals in a given memory slot in sound generating device 110.

Although the programming system 200 in FIG. 4 has been shown with a personal computer 201, other computers also are possible to program the alert signal library in the sound generating device 100. Such other computers include, but are not limited to, laptop computers, personal data assistants, suitable interactive paging systems, or the like. A telephone body 101 itself may be additionally programmed by its manufacturer to be able to scroll through, access, and edit alert signals in the signal library of a sound generating device 110 in an audio signal device 102.

Finally, the shape and geometry of different audio signal devices 102 would depend on the particular brand and model of cellular telephone body 101 and battery 150 that is to be connected to the device 102. Thus, consumers of such a device 102 would likely need to purchase devices 102 specifically designed for their particular brand and model of cellular telephone.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device that plays sounds and is used with a cellular telephone, the device comprising:
    a substantially rectangular planar shell having electric terminals on one side that are electrically connectable to electric terminals on a cellular telephone;
    a battery powering the cellular telephone, the battery electrically connected to the electrical connectors of the planar shell,
    a sound generating device located inside the shell and electrically connected to the electrical connectors of the planar shell, and
    a memory for storing a sound file;
    wherein the sound generating device is triggered to play sound associated with the sound file upon detection of a signal from the cellular telephone to the battery generated by a telephone call by the cellular telephone, and
    wherein the sound generating device is also triggered to play the sound associated with the sound file upon detection of a signal from the cellular telephone to the battery generated by an event at the cellular telephone other than a telephone call.

2. The device of claim 1, further comprising an external connector socket coupled with the shell in electrical communication with the sound generating device to provide external access for adding sound files, deleting sound files and editing sound files in the memory.

3. The device of claim 2, further comprising a selector device on the shell for designating a sound file to use as a sound alert.

4. The device of claim 1, wherein a computer electrically connected to the external connector socket adds, deletes, and edits the plurality of sound files on the memory.

5. The device of claim 4, wherein the computer is a personal data assistant.

6. A wireless communication system having changeable sound alerts, the system comprising:
    a wireless communication device having a plurality of device electric terminals;
    a battery having a plurality of battery electric terminals, the battery electrically connected to the wireless communication device through the battery electric terminals;

a sound generating device coupled with the battery and electrically connected to the battery electrical terminals, and a memory for storing a sound file, the memory coupled with the battery and electrically connected to the battery electrical terminals;

wherein the sound generating device is triggered to play sound associated with the sound file upon detection of a signal from the wireless communication device to the battery generated by an incoming communication by the wireless communication device, and wherein the sound generating device is also triggered to play the sound associated with the sound file upon detection of a signal from the wireless communication device to the battery generated by an event at the wireless communication device other than an incoming communication.

7. The system of claim 6, further comprising an external connector socket coupled with the battery and in electrical communication with the sound generating device to provide external access for adding sound files, deleting sound files and editing sound files in the memory.

8. The system of claim 7, further comprising a selector device coupled to the battery for designating a sound file to use as a sound alert.

9. The system of claim 6, further comprising a computer electrically connected to the external connector socket, the computer for adding, deleting, and editing the plurality of sound files on the memory.

10. The system of claim 9, wherein the computer is a personal data assistant.

11. The system of claim 6, wherein the wireless device is a cellular telephone, and the incoming communication is a telephone call.

12. The system of claim 6, wherein the battery, sound generating device, and memory are within a substantially rectangular planar shell.

13. A method of selecting a designated sound alert for a wireless communication device, the wireless communication device coupled with a battery, the battery including a sound generating device, a selector, and a memory having a plurality of sound files, the method comprising:

scrolling, with the selector, to hear the plurality of alert files;

selecting a sound file from the plurality of sound files to be a designated sound alert;

playing the sound file upon detection of a signal from the wireless communication device to a battery generated by an incoming call at the wireless communication device; and playing the sound file upon detection of a signal from the wireless communication device to the battery generated by an event at the wireless communication device other than an incoming communication.

14. The method of claim 13, further comprising storing a plurality of sound files in the memory.

15. The method of claim 13, further comprising generating a first electric signal from the wireless communication device to the battery in response to an incoming communication.

16. The method of claim 13, further comprising generating a second electric signal from the wireless communication device to the battery in response to an event at the wireless communication device other than an incoming communication.

17. The method of claim 13, wherein the battery includes an external connector socket.

18. The method of claim 17, further comprising using a computer electrically connected to the external connector socket for adding, deleting, and editing the plurality of sound files on the memory.

19. The method of claim 18, wherein the computer is a personal data assistant.

20. The method of claim 13, wherein the battery, sound generating device, and memory are within a substantially rectangular planar shell.

\* \* \* \* \*